United States Patent

[11] 3,575,330

| [72] | Inventor | Albert Sniderman<br>Southfield, Mich. |
|---|---|---|
| [21] | Appl. No. | 853,899 |
| [22] | Filed | Aug. 28, 1969 |
| [45] | Patented | Apr. 20, 1971 |
| [73] | Assignee | Burroughs Corporation<br>Detroit, Mich. |

[54] INTERMITTENT WEB-TRANSPORTING DEVICE
3 Claims, 3 Drawing Figs.

[52] U.S. Cl. ................................................. 226/164,
226/167
[51] Int. Cl. .................................................. B65h 17/36
[50] Field of Search ...................................... 226/158,
164, 167; 271/44

[56] References Cited
UNITED STATES PATENTS

| 2,251,985 | 8/1941 | Coats | 226/164 |
| 3,386,634 | 6/1968 | Curry | 226/164X |

*Primary Examiner*—Allen N. Knowles
*Attorney*—Paul W. Fish

ABSTRACT: The disclosure embodies a friction pad for intermittently transporting a web and includes mechanism for driving the pad and directing its motion. The friction pad is resiliently mounted on a reciprocatable member and imparts to the web a driving force which is the resultant of a forward component of force from the reciprocatable member and a normal component of force resulting from the obliquely offset disposition of the pad with respect to the reciprocatable member.

Patented April 20, 1971 3,575,330
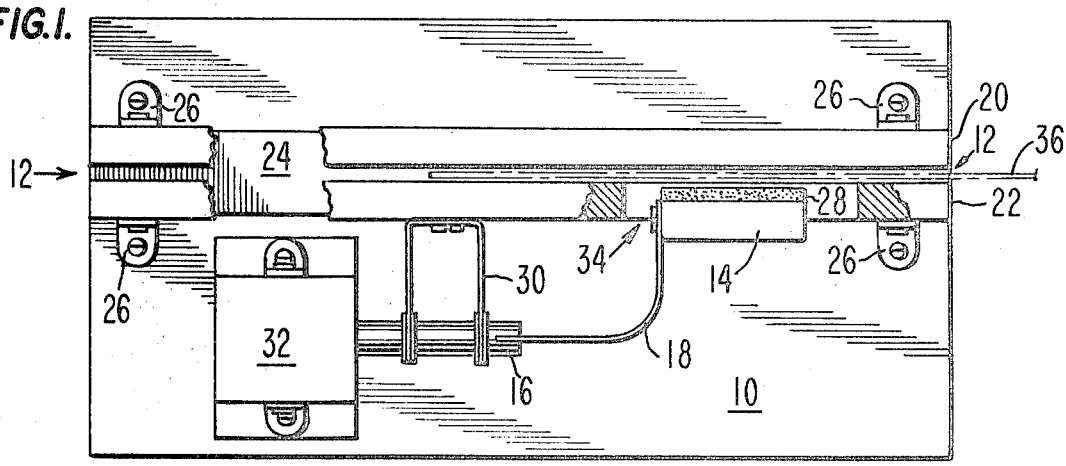
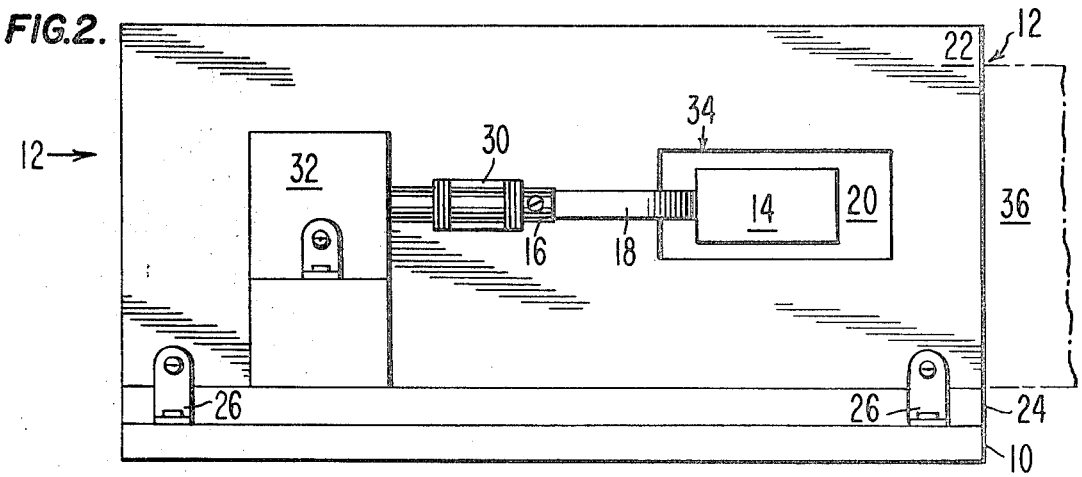
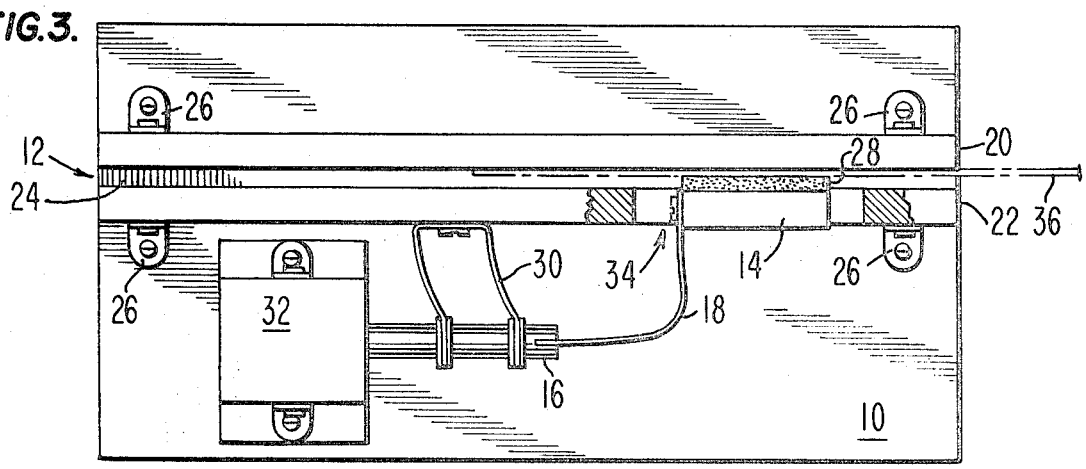
INVENTOR.
ALBERT SNIDERMAN.
BY
ATTORNEY.

INTERMITTENT WEB-TRANSPORTING DEVICE

SUMMARY OF THE INVENTION

The invention resides in the provision of a resilient member for operatively connecting a reciprocatable member to a friction pad to drive a web in a transport device.

Any friction-drive, web-transporting device requires the presence of two force components to function, one normal to and one parallel to the desired direction of web travel. The resultant parallel driving force applied to the web is a function of the coefficient of friction of the respective contacting surfaces and the normal force acting between them.

Prior art discloses friction-drive devices that intermittently apply driving forces to the web, such as rotating drive rollers and reciprocatable friction pads that are mechanically forced into effective contact with the web for a predetermined time and them mechanically removed from contact. These devices have the disadvantage of requiring, in addition to driving mechanisms, supplementary mechanisms to bring the driving surface into effective contact with the web. Such additional mechanisms normally include a plurality of moving parts, which are necessarily costly to produce and maintain.

Accordingly, it is the object of this invention to provide a device which is simple and inexpensive to manufacture and maintain to intermittently couple the driving mechanism to the driving surface.

IN THE DRAWINGS

FIG. 1 is a plan view, partly in section, of an intermittent web-transporting device embodying features of the invention; and FIG. 2 is a side view of the device of FIG. 1;

FIG. 3 is a view similar to FIG. 1 illustrating the motion of the parts in the transporting operation.

Referring to FIGS. 1, 2 and 3, the web-transporting device shown has a horizontal base 10 supporting an elongated and horizontally disposed guide channel 12. A web-driving friction pad 14 is effectively positioned adjacent to the channel 12 and coupled to a horizontally reciprocatable armature 16 by a drive-coupling spring 18.

The guide channel 12 is formed by a first upright plate 20, a second upright plate 22 and a bottom plate 24 and is bolted or otherwise secured to the base 10 by mounting brackets 26. The horizontally reciprocatable armature 16 is resiliently mounted on the second upright plate 22, external to the channel 12, by a mounting spring 30. The armature 16 may, as shown, be reciprocated by any one of a number of well-known business machine solenoids 32 mounted on the base 10.

The driving pad 14 is resiliently positioned in a horizontally elongated perforation or opening 34 in the second upright plate 22 with its driving surface 28, (FIGS. 1 and 3) which has a relatively high coefficient of friction, adjacent and parallel to the plane of the channel 12 by one end of the drive coupling spring 18. The opposite end of the coupling spring 18 is connected to the armature 16. The coupling spring 18 is longitudinally curved or bent such that the driving pad 14 is obliquely offset toward the channel 12 relative to the path of travel of the reciprocatable armature 16. The horizontal dimension of the opening 34 in the second upright plate 22 is greater than the horizontal dimension of the driving pad 14 by an amount somewhat greater than the stroke length of the reciprocatable armature 16.

OPERATION

With reference to FIGS. 1, 2 and 3, assuming the device is in operation, the solenoid 32 will horizontally reciprocate the armature 16. As the armature 16 moves to the right, the coupling spring 18 will communicate a commensurate force to the driving pad 14. This force will tend to accelerate the driving pad 14 in the same direction of travel as that of the armature 16. The driving pad 14, however, having a predetermined mass, will exert an opposing, inertial force on the coupling spring 18. Since the mass of the driving pad 14 is obliquely offset relative to the path of travel of the armature 16, the resultant force will distort the coupling spring 18, causing the driving pad 14 to swing across the channel 12, pinching a web 36 between the driving pad 14 and the first upright plate 20 as shown in FIG. 3.

As the armature 16 continues to move to the right, the driving pad 14 will be forced to move in the same direction. Since the coefficient of friction between the driving pad surface 28 (FIGS. 1 and 3) and the web 36 is greater than that between the web 36 and the first upright plate 20, the web 36 will be driven in the direction of motion of the driving pad 14.

When the armature 16 is reversed in its direction by the solenoid 32, a commensurate force will be communicated by the coupling spring 18 to the driving pad 14. This force will tend to stop the motion of the driving pad 14 to the right and accelerate it in the new direction of travel of the armature 16, that is, to the left. The inertial force due to the mass of the driving pad 14, however, will again oppose the accelerating force; and, since the mass of the driving pad is obliquely offset relative to the path of travel of the armature 16, the resultant force will distort the coupling spring 18, causing the driving pad 14 to swing away from the first upright plate 20 and the web 36 as the driving pad 14 moves to the left.

The next reversal in the direction of armature 16 travel by the solenoid 32 will again swing the driving pad 14 against the web 36, moving the web 36 in the direction of armature travel and beginning the next cycle of operation.

As can be appreciated by anyone skilled in the art, a number of devices herein described can be sequentially arranged along a guide channel and, with synchronized operation, effect practically continuous web motion.

I claim:

1. An intermittent web-transporting device comprising an apertured guide channel, a reciprocatable member resiliently mounted on said guide channel, a driving friction pad disposed in said guide channel aperture and obliquely offset relative to the path of travel of said reciprocatable member, and a coupling spring effectively coupling said driving friction pad to said reciprocatable member.

2. The device as defined by claim 1 wherein the mass of said obliquely offset driving friction pad is sufficient to enable the inertial force therein produced to overcome the resilient force of said coupling spring.

3. The device as defined in claim 1 wherein said driving friction pad is obliquely offset in the direction of web travel from said reciprocatable member.